United States Patent [19]

Niino

[11] Patent Number: 4,908,595

[45] Date of Patent: Mar. 13, 1990

[54] MOTOR PROTECTOR

[75] Inventor: Masahiko Niino, Minami, Japan

[73] Assignee: Yamada Electric Mfg. Co., Ltd., Japan

[21] Appl. No.: 351,873

[22] Filed: May 12, 1989

[51] Int. Cl.⁴ .................. H01H 61/07; H01H 71/16; H02H 5/04

[52] U.S. Cl. ..................... 337/105; 361/22; 361/24; 361/105; 337/103

[58] Field of Search ............ 337/105, 103, 102, 107, 337/104, 100, 101, 38, 39, 40; 361/22, 24, 25, 26, 105, 106, 103

[56] References Cited

U.S. PATENT DOCUMENTS 2,189,996  2/1940  Riche ..................... 337/40
4,422,120  12/1983  Kobayashi et al. ........... 361/24
4,456,941  6/1984  Fraser, Jr. et al. ........... 361/24

Primary Examiner—H. Broome
Attorney, Agent, or Firm—Steele, Gould & Fried

[57] ABSTRACT

A motor protector includes a case having an open end, a terminal plate secured to the case and having a pair of fixed contacts, a disc-shaped bimetal supported in the case and having a pair of movable contacts engaged with and disengaged from the fixed contacts respectively, a temperature-sensitive switch disposed so as to close the open end of the case and sensing the temperature of a sensed object to be turned on when the temperature thereof reaches a predetermined value, and a heater disposed in the vicinity of the bimetal and connected in series to the temperature-sensitive switch.

4 Claims, 4 Drawing Sheets

MOTOR PROTECTOR

BACKGROUND OF THE INVENTION

The present invention relates to a motor protector suitable for protecting enclosed compressors of room air conditioners.

In room air conditioners of the separate type, an indoor unit is connected to an outdoor unit through a pipe. An incomplete piping sometimes causes a refrigerant such as fleon flowing through the pipe to leak out. An enclosed compressor is overheated owing to leakage of the refrigerant but the motor current is not increased over the level of no load current. Accordingly, motor protectors only responsive to the motor current cannot protect the compressor sufficiently.

In view of the above-described problem, the prior art has provided a hermetically sealed motor protector mounted in the compressor so that the temperature of the compressor is directly sensed, thereby preventing the compressor motor from being burned out owing to overheat of the compressor.

However, the prior art hermetically sealed motor protector needs a large mounting space, which increases the dimensions of the compressor. Consequently, the production cost of the compressor and hence the room air conditioner and the handling inconvenience are increased.

SUMMARY OF THE INVENTION

Therefore, an object of the present invention is to provide a motor protector which does not increase the dimensions of the compressor as a sensed object and can be mounted on the outer surface of the compressor casing with ease with handling convenience.

In order to achieve the above-described object, the motor protector of the present invention comprises a case having an open end, a pair of terminal plates secured to the case and each provided with a fixed contact, and a bimetallic member supported in the case and provided with two movable contacts which are engaged with the fixed contacts in a normal curvature condition of the bimetallic member, respectively. The bimetallic member reverses its curvature with snap action in response to heat such that the movable contacts are disengaged from the fixed contacts respectively. It is preferable that the bimetallic member be formed into a dish shape and reverse its curvature in response to heat. It is further preferable that the disc-shaped bimetallic member be supported by an adjusting screw. The motor protector of the invention further comprises a temperature-sensitive switch provided in the case so as to close the open end thereof and a heater provided in the vicinity of the bimetallic member. The temperature-sensitive switch senses the temperature of the outer surface of the compressor as a sensed object and is turned on when the temperature thereof reaches a predetermined value, for example, 120° C. The heater is connected in series to the temperature-sensitive switch in the protector case. The protector case enclosing the above-described and other parts is mounted on a mounting frame mounted on the casing of the compressor and urged by a spring member toward the casing such that the temperature-sensitive switch is closely brought into contact with the outer surface of the casing of the compressor.

In case that the motor current is increased owing to an overload or locked rotor condition of the compressor motor, the bimetallic member reverses its curvature with snap action as in the prior art when the temperature of the bimetallic member is raised to a predetermined value, for example, 160° C. by way of self-heating under the influence of increased motor current, whereby the movable contacts are disengaged from the fixed contacts respectively. Furthermore, when the temperature of the compressor is increased to a predetermined value, for example, 120° C. owing to leakage of the refrigerant or for any other reason, the temperature-sensitive switch is turned on to thereby energize the heater placed in the vicinity of the bimetallic member. The bimetallic member is subjected to heat generated by the heater and reverses its curvature so that the movable contacts are disengaged from the fixed contacts respectively. Consequently, the motor circuit of the compressor is cut off in both of the cases of current increase owing to the overload or locked rotor condition and the temperature increase of the compressor owing to refrigerant leakage or the like.

Other and further objects of the present invention will become obvious upon understanding of the illustrative embodiments about to be described or will be indicated in the appended claims, and various advantages not referred to herein will occur to one skilled in the art upon employment of the invention in practice.

DESCRIPTION OF THE PREFERRED EMBODIMENT

Figure 1:
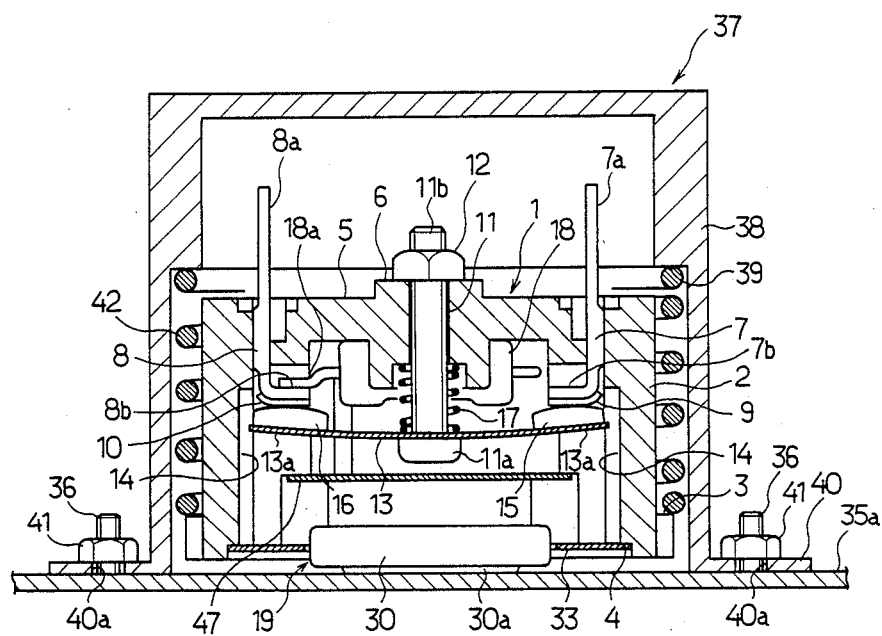
FIG. 1 is a longitudinal sectional view of the motor protector of an embodiment mounted on an enclosed compressor.

An embodiment of the motor protector of the invention will now be described with reference to the accompanying drawings. Referring first to FIGS. 1 to 4, a cylindrical case 1 of the motor protector is formed from a synthetic resin and has an open end. The case 1 has a flange 3 formed along the outer periphery of a peripheral wall 2 at the open end side. A stepped portion 4 is formed on the inner periphery of the peripheral wall 2 at the open end side. A boss 6 is formed on the center of an upper wall 5 of the case 1. A pair of terminal plates 7 and 8 each comprising a copper-steel clad or brass plate is extended through apertures formed in the upper wall 5 and fixed. The terminal plates 7 and 8 have terminal portions 7a and 8a outwardly projected from the upper wall 5 respectively. The ends of the terminal plates 7 and 8 positioned in the case 1 are bent in the direction of the center thereof. Fixed contacts 9 and 10 formed from an Ag-CdO alloy are fixedly secured to the bent portions 7b and 8b of the terminal plates 7 and 8 respectively. An adjusting screw 11 is screwed through an aperture formed in the boss 6. The adjusting screw 11 includes a head portion 11a and a screw portion 11b. A nut 12 is threadably engaged with the projected end of the thread end 11b. A bimetallic member 13 is supported at the center by the head portion 11a of the adjusting screw 11. The bimetallic member 13 is formed into a generally circular disc shape and normally has a slightly upwardly concave curvature. The bimetallic member has oppositely disposed guide strips 13a formed integrally therewith. The guide strips 13a are loosely fitted in guide recesses 14 formed in the inside of the peripheral wall 2, respectively. Movable contacts 15 and 16 formed from Ag-CdO alloy are fixedly secured to guide strips 13a of the bimetallic member 13 so as to be normally engaged with the fixed contacts 9 and 10, respectively. A compression coil spring 17 is interposed between the center portion of the bimetallic member 13 and the boss 6 of the case 1 so that the bimetallic member 13 is elastically held by the head portion 11a of the adjusting screw 11. A heater 18 is provided in the vicinity of the bimetallic member 13 in the case 1. The heater 18 comprises a metallic oxide film resistor and has a resistance of, for example, 6.2 KΩ. A terminal 18a of the heater 18 is connected to the bent strip 8b of the terminal plate 8 by way of welding.

Figure 5:
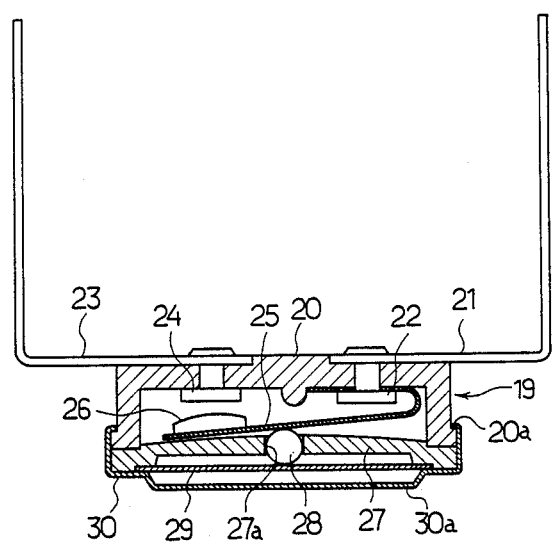
FIG. 5 is a longitudinal sectional view of the temperature-sensitive switch employed in the motor protector.
Figure 6:
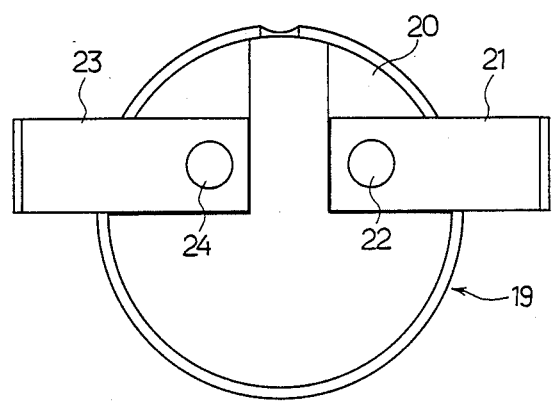
FIG. 6 is a bottom view of the temperature-sensitive switch.

A temperature-sensitive switch 19 is disposed at the open end side in the case 1. As shown in FIGS. 5 and 6, the temperature-sensitive switch 19 comprises a generally circular flat container-shaped base 20 formed from diallylphthalate. A terminal 21 formed from brass is secured to the base 20 by way of a rivet 22 formed from brass and simultaneously, one end of a generally U-shaped arm member 25 formed from beryllium copper is secured to the base 20. A terminal 23 formed from brass is secured to the base 20 by way of a contact rivet 24 formed from Ag. A contact member 26 formed from a silver alloy is secured to the other end of the arm member 25 so as to be opposed to the contact rivet 24. A guide member 27 formed from diallyl phthalate is attached to the base 20. A guide aperture 27a is formed in the central portion thereof and a spherical actuator 28 formed from soda-lime glass is fitted in the guide aperture 27a. Spring force of the arm member 25 usually urges the actuator 28 downwardly. A flat bimetallic disc 29 is disposed between the actuator 28 and a generally circular heat-sensitive cap 30 so as to support the actuator 28 at the central portion thereof. The heat-sensitive cap 30 is formed from brass or aluminum and secured to the flange 20a of the base 20 by way of caulking. The heat-sensitive cap 30 has a downwardly expanded heat sensing portion 30a, as viewed in FIG. 5.

Figure 2:
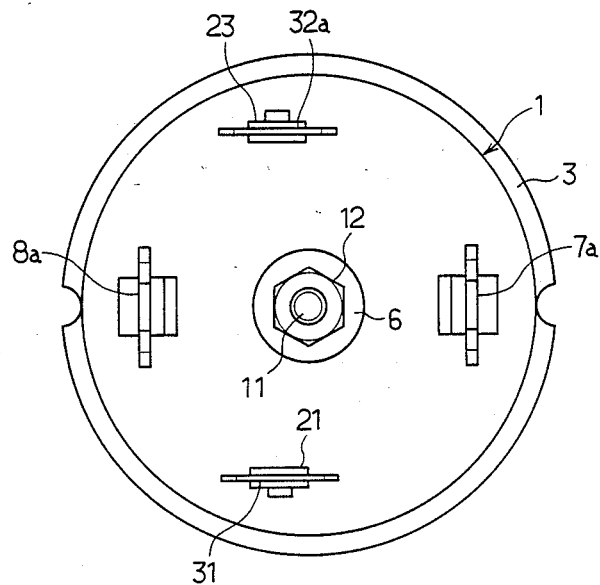
FIG. 2 is a top view of the motor protector.
Figure 3:
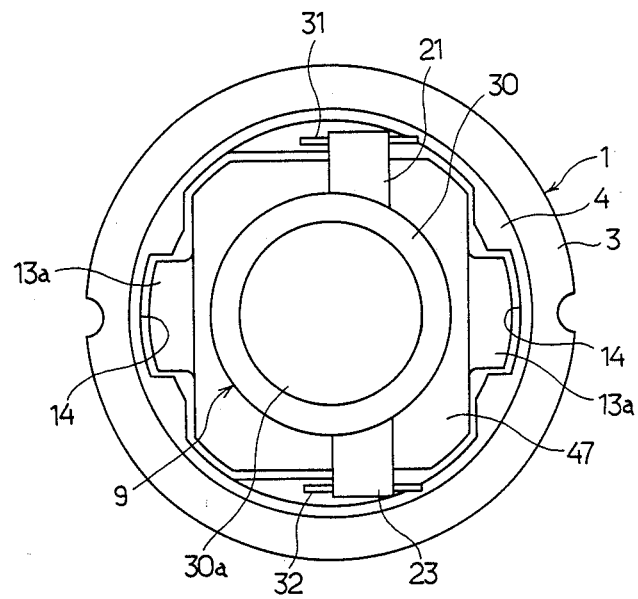
FIG. 3 is a bottom view of the motor protector with a cap detached.
Figure 4:
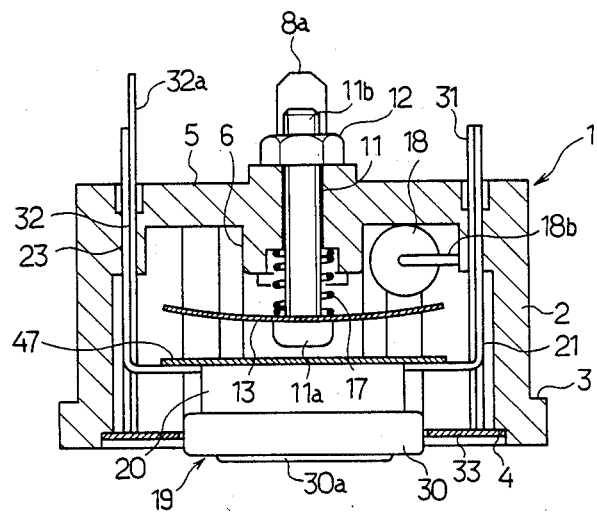
FIG. 4 is a longitudinal sectional view of the motor protector as viewed from an angle different from that of FIG. 1 90 degrees.

As shown in FIGS. 2 and 4, the terminals 21 and 23 of the temperature-sensitive switch 19 are extended through apertures formed in the upper wall 5 of the case 1 and fixed in position respectively. Welding terminal 31 and connecting terminal 32 formed from brass are welded to the terminals 21 and 23, respectively. One end of the connecting terminal 32 projected from the upper wall 5 of the case 1 is utilized as a terminal 32a. The other terminal 18b of the heater 18 is connected to the welding terminal 31. An insulating paper 47 comprising aramid fiber paper is affixed to the upper side of the temperature-sensitive switch 19. An annular cap 33 formed from an aluminum plate is attached to the stepped portion 4 of the case 1 such that the open end of the case 1 is closed by the temperature switch 19 and the cap 33. The heat sensing portion 30a of the heat sensitive cap 30 is adapted to be positioned slightly lower than the open end of the case 1, as viewed in FIG. 1.

Figure 7:
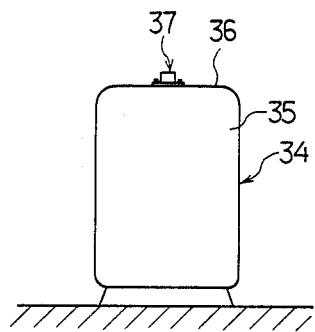
FIG. 7 is a side view of the compressor.

The motor protector of the embodiment as described above is mounted on a casing 35 of an enclosed compressor 34 as the sensed object in the room air conditioner of the separate type, as is shown in FIGS. 1 and 7. More specifically, a plurality of, for example, two mounting studs 36 are screwed in an upper wall 35a of the casing 35. The motor protector is disposed so that the temperature switch 19 is positioned between the mounting studs 36 on the upper wall 35a. A cup-shaped mounting frame 37 having an open lower end is disposed so as to enclose the temperature switch 19. The mounting frame 37 has a stepped portion 39 formed in the inner periphery of the peripheral wall 38 and an outwardly extended flange 40 formed at the lower end thereof. The flange 40 has a plurality of through-apertures 40a the number of which corresponds to that of the studs 36. The mounting frame 37 is fixed on the upper wall 35a of the compressor casing 35 by inserting the studs 36 through the apertures 40a and threadably engaging nuts 41 with the studs 36, respectively. A compression coil spring 42 is interposed between the stepped portion 39 of the mounting frame 37 and the flange 3 of the case 1 so that the case 1 is downwardly urged, whereby the heat sensing portion 30a of the temperature switch 19 is elastically in contact with the outer surface of the upper wall 35a of the compressor casing 35.

Figure 8:
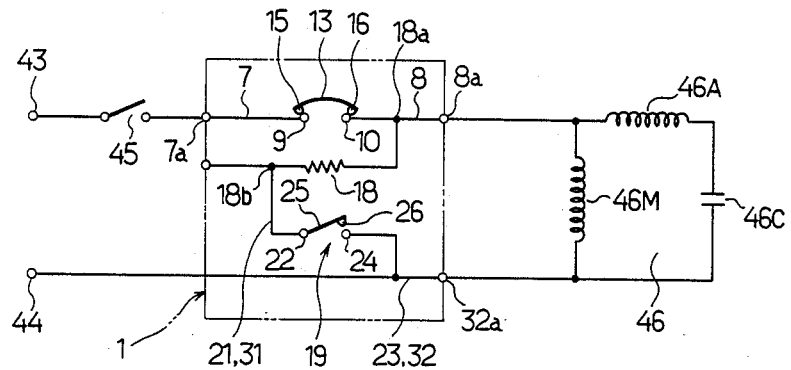
FIG. 8. is an electrical connection diagram of the motor protector.

The electrical arrangement of the above-described motor protector will now be described with reference to FIG. 8. Commercial electrical power is supplied to AC power supply terminals 43 and 44. The terminal 43 is connected to a terminal 7a through a power switch 45 including a temperature control switch. The other AC power supply terminal 44 is connected to a terminal 32a. An electric motor 46 of the enclosed compressor 34 includes a main winding 46M, auxiliary winding 46A and capacitor 46C. A series circuit of the auxiliary winding 46A and capacitor 46C is connected in parallel with the main winding 46M. A common connection of the main and auxiliary windings 46M and 46A is connected to a terminal 8a. A common connection of the main winding 46M and capacitor 46C is connected to a terminal 32a.

Operation of the motor protector will now be described. In case that the overload or locked-rotor condition of the compressor motor 46 causes the motor current to be increased, the temperature of the bimetallic member 13 is increased by self-heating thereof under the influence of the increased motor current. When the temperature of the bimetallic member 13 reaches a predetermined value, for example, 160° C., the bimetallic member 13 reverses its curvature by snap action such that the movable contacts 15 and 16 are disengaged from the fixed contacts 9 and 10 respectively. Consequently, the compressor motor 46 is deenergized to thereby stop the operation of the compressor 34.

In case that the refrigerant leakage or the like causes the temperature of the compressor 34 to be increased, heat is transmitted to the disc 29 of the temperature-sensitive switch 19 through the compressor housing 35 and the heat sensitive cap 30. When the temperature of the disc 29 reaches a predetermined value, for example, 120° C., the disc 29 reverses its curvature by snap action so as to be upwardly concave, thereby depressing the actuator 28. As the result of depression of the actuator 28, the arm member 25 is upwardly urged against spring force thereof such that the contact 26 is engaged with the contact rivet 24, thereby turning the temperature-sensitive switch 19 on. Upon turn on of the temperature-sensitive switch 19, the heater 18 is energized and the bimetallic member 13 is subjected to heat from the heater 18. When the temperature of the bimetallic member 13 reaches the predetermined value, the bimetallic member 13 reverses its curvature in snap action such that the movable contacts 15 and 16 are disengaged from the fixed contacts 9 and 10 respectively. Consequently, the compressor motor 46 is deenergized to thereby stop the operation of the compressor 34.

The spring force of the compression coil spring 17 is varied by rotating the nut 12 so that the operative temperature of the bimetallic member 13 is adjusted.

The foregoing disclosure and drawings are merely illustrative of the principles of the present invention and are not to be interpreted in a limiting sense. The only limitation is to be determined from the scope of the appended claims.

What I claim is:

1. A motor protector comprising:
   (a) a case having an open end;
   (b) a pair of terminal plates secured to the case and each provided with a fixed contact;
   (c) a bimetallic member supported in the case and provided with two movable contacts which are engaged with the fixed contacts in a normal curvature condition of the bimetallic member, respectively, the bimetallic member reversing its curvature with snap action in response to heat such that the movable contacts are disengaged from the fixed contacts respectively;
   (d) a temperature-sensitive switch mounted in the case so as to close the open end thereof, the temperature-sensitive switch sensing the temperature of a sensed object and being turned on when the temperature thereof reaches a predetermined value under the influence of heat from the sensed object; and
   (e) a heater provided in the vicinity of the bimetallic member and connected in series to the temperature-sensitive switch.

2. A motor protector according to claim 1, wherein the bimetallic member is formed into a disc shape and reverses its curvature with snap action in response to heat.

3. A motor protector according to claim 2, wherein the bimetallic member is held by an adjusting screw in the case.

4. A motor protector according to claim 1, the sensed object includes a compressor comprising a casing and wherein the case is mounted on a mounting frame mounted on the casing of the compressor and urged by a spring member so that the temperature-sensitive switch is closely brought into contact with the outer surface of the casing of the compressor.

* * * * *